United States Patent
Huston

(10) Patent No.: US 7,855,638 B2
(45) Date of Patent: *Dec. 21, 2010

(54) GPS BASED SPECTATOR AND PARTICIPANT SPORT SYSTEM AND METHOD

(76) Inventor: Charles D. Huston, 3900 Laguna Vista Cove, Austin, TX (US) 78746

( * ) Notice: Subject to any disclaimer, the term of this patent is extended or adjusted under 35 U.S.C. 154(b) by 702 days.

This patent is subject to a terminal disclaimer.

(21) Appl. No.: 11/456,715

(22) Filed: Jul. 11, 2006

(65) Prior Publication Data

US 2007/0015586 A1 Jan. 18, 2007

Related U.S. Application Data

(60) Provisional application No. 60/699,205, filed on Jul. 14, 2005.

(51) Int. Cl.
G08B 1/08 (2006.01)

(52) U.S. Cl. .................. 340/539.13; 386/117; 386/46; 382/103; 382/154; 382/276

(58) Field of Classification Search ............ 340/539.13; 342/103
See application file for complete search history.

(56) References Cited

U.S. PATENT DOCUMENTS

| | | | |
|---|---|---|---|
| 5,364,093 A | 11/1994 | Huston et al. | |
| 5,802,492 A * | 9/1998 | DeLorme et al. | 455/456.5 |
| 6,115,177 A | 9/2000 | Vossler | |
| 6,195,090 B1 | 2/2001 | Riggins, III | |
| 6,317,127 B1 | 11/2001 | Daily et al. | |
| 6,671,390 B1 * | 12/2003 | Barbour et al. | 382/103 |
| 6,744,403 B2 | 6/2004 | Milnes et al. | |
| 6,801,516 B1 | 10/2004 | Lomp et al. | |
| 6,879,443 B2 | 4/2005 | Spitzer et al. | |
| 6,885,652 B1 | 4/2005 | Ozukturk et al. | |
| 6,894,994 B1 | 5/2005 | Grob et al. | |

(Continued)

FOREIGN PATENT DOCUMENTS

EP 1113669 7/2001

(Continued)

OTHER PUBLICATIONS

Barstow et al., "Personalized Interactive Real-TIme Sports Reporting Using Java," American Programmer, Jan. 1997, pp. 32-37.

(Continued)

Primary Examiner—George A Bugg
Assistant Examiner—Ojiako Nwugo
(74) Attorney, Agent, or Firm—Charles D. Huston; Daffer McDaniel, LLP

(57) ABSTRACT

A spectator sport system and method that displays different views of a sporting event and, in particular, uses the spectator's GPS position to assist in displaying a view from the spectator's position. The spectator, using a personal device, can zoom, pan, tilt and change the view, as well as change the view to another position, such as a finish line, goal, or a participant position. Vital information on the sporting event or a participant can be appended to the view. In some forms, augmented reality can be used, such as a finish line or goal, to enhance the experience. Additional service requests can be made from the personal device.

37 Claims, 6 Drawing Sheets

U.S. PATENT DOCUMENTS

| | | |
|---|---|---|
| 6,909,738 B2 | 6/2005 | Akopian et al. |
| 6,917,644 B2 | 7/2005 | Cahn et al. |
| 7,002,551 B2 | 2/2006 | Azuma et al. |
| 7,053,780 B1 | 5/2006 | Straub et al. |
| 2004/0036622 A1* | 2/2004 | Dukach et al. ........... 340/691.6 |
| 2004/0104935 A1* | 6/2004 | Williamson et al. ......... 345/757 |
| 2005/0148388 A1* | 7/2005 | Vayra et al. .................... 463/32 |
| 2005/0207617 A1* | 9/2005 | Sarnoff ....................... 382/103 |
| 2005/0259002 A1 | 11/2005 | Erario et al. |
| 2006/0104600 A1* | 5/2006 | Abrams ....................... 386/46 |
| 2006/0105857 A1 | 5/2006 | Stark |

FOREIGN PATENT DOCUMENTS

| | | |
|---|---|---|
| EP | 1262213 | 12/2002 |
| WO | 01/05476 | 1/2001 |
| WO | 01/36061 | 5/2001 |

OTHER PUBLICATIONS

International Search Report, PCT/US2006/027218, mailed Feb. 12, 2007.

O'Malley et al., "Human Activity Tracking for Wide-Area Surveillance," University of Florida, Department of Electrical and Computer Engineering, May 2002, 7 pages.

* cited by examiner

GPS BASED SPECTATOR AND PARTICIPANT SPORT SYSTEM AND METHOD

PRIORITY CLAIM

This application claims priority to U.S. Provisional Application No. 60/699,205 filed Jul. 14, 2005 and claims the benefit under 35 U.S.C. §120 to concurrently-filed application entitled "GPS Based Situational Awareness and Identification System and Method."

BACKGROUND

1. Field of the Invention

This invention relates generally to a spectator sport system that displays different views of the event and, in particular, uses the spectator's GPS position to assist in displaying a view.

2. Description of Related Art

GPS systems have been used in sports by participants in contests where position, location and distance to features are important. For example, U.S. Pat. No. 5,364,093 describes a GPS system and method for allowing a golfer to tell distance to a hole or other feature, and permits the course to track and manage golfers on the course. NASCAR with Sportsline has developed a GPS system mounted to cars for TV viewers to monitor a race.

GPS systems are becoming much more accurate, inexpensive and robust. GPS antennas and engines are fairly inexpensive and accurate with WAAS to less than 2 meters. At a sporting arena, the accuracy can be improved to centimeters, depending on the accuracy required, latency constraints, processing and bandwidth available, etc. Further, communication links are becoming very inexpensive and high bandwidth. For example, WiFi (802.11g) has modems with network signals approaching a 1 mile range, cost less than $5, with bandwidth of 54M bit/sec. Wi-max (802.16) has network signals approaching 30 miles with data rates as high as 70M bit/sec, but is more relevant to fixed installations Future versions of WiFi or other radio technology might be less than $1 with 10—100× bandwidths within a few years (as used herein WiFi refers to current and future versions of wireless local area networks (WLAN) based on the IEEE 802.11 specifications).

What has not been done is an integrated GPS system for spectators to more fully enjoy a sport. For example, at a NASCAR race, a spectator's location limits his view of the race and is his own unique perspective. While watching a race, the spectator might listen to a radio or watch a portable TV, but the perspective is the announcer's or TV angle. Such divergent perspectives—announcer versus personal—can be confusing. Further, a $3^{rd}$ turn spectator might be most interested in the cars he can see—the ones near the $3^{rd}$ turn. Other sports would benefit from a system that allows a spectator to more fully integrate the contest information with his viewing perspective. In addition to auto racing, football, yachting, horse racing, golf, hockey or any motor sport are candidates for the system and method hereof, especially as size and weight of GPS and radios accompanying a participant decreases.

U.S. Pat. No. 6,744,403 describes a GPS system for tracking objects, such as cars, at a sporting event. See also, U.S. Pat. No. 6,195,090; U.S. Pat. App. 20060105857; U.S. Pat. App. 20050259002. High data rate packet transmission is known, such as U.S. Pat. Nos. 6,894,994; 6,909,738; 6,885,652; 6,917,644; 6,801,516. Examples of user interfaces, such as PDA's, cell phones, headsets, and the like are U.S. Pat. Nos. 7,053,780; 6,879,443 and 6,115,177. All references cited herein are incorporated by reference.

SUMMARY

The present invention contemplates a GPS system that provides contest information relevant to the viewer's perspective or location or is selectable to view the contest from another location. Preferably, the participants are GPS equipped and communicate their GPS position (and other sensor information) with a server. The spectators have a portable viewing device that accepts the participants position and selectively renders a view of the contest (and/or other information) from the spectators perspective or location or selectively from another location. Even remote spectators can use the portable device with a network information feed.

For example, in a NASCAR race, the cars are all equipped with a GPS engine and a communication link to a central server. Each spectator has a portable device that has a GPS engine, as well as a communication link to the central server. The portable device logs in with the central server, optionally authenticating and telling the server the spectator's location at the track. During the race, the positions of the cars are broadcast to the spectators. In one mode, the portable device displays information most relevant to the spectator's location. For example, the position and vital information of the cars nearest the spectator. In another mode, the portable device has the processing power to take the positions of the cars and the location of the spectator and render a depiction of the cars in real time on the track. The spectator can select the view. For example, the spectator might select "finish line," "overhead," "car 3 driver's view," or "my view."

A spectator at the $3^{rd}$ turn with "my view" selected can see the perspective of the rendering on the portable device to match his own visual observation—i.e. his location including elevation. This adds to a much greater enjoyment of the contest because visual data is added to the display which matches his visual observation. Importantly, the spectator can not only switch views, but can also tilt or pan the perspective or observation point or zoom. That is, from "my view" the spectator might rotate a toggle up incrementally up (or down) from the horizontal view from the spectator's location of the car positions to a vertical view of the contest. Preferably, the toggle would also allow left/right pan at any time.

In addition to the view of the vehicles (or contestants) the spectator can selectively view appended important information. For example, in one mode the user might select no information, in a second mode, the user might select car identification only, while in another mode, the user might select identification plus speed, plus acceleration of one or more selected cars. Other information from car sensors are possible (or derived from GPS information) such as linear or radial G, engine or tire condition, fuel state, etc. Preferably, the spectator could go from a view mode to other modes, such as a display of the current information of the cars in tabular form, a view from a particular camera (streaming video), pit video or rendering, etc. Preferably, the portable device would include a radio (any type of communication link, even high data rate GPRS) to relay audio for monitoring car or pit communications or radio broadcasts.

In "my view," for example, the portable device might display only information to the $3^{rd}$ turn spectator for cars nearest the $3^{rd}$ turn. Alternatively, the spectator might want to follow a particular car continuously, e.g. follow car number 8, with selectable views (overheard, turns, stands, head, driver's view). In any of these modes, the spectator could zoom, pan or tilt as described above, freeze, slow motion, replay, etc.

While the preferred embodiment is described in the context of a car race such as NASCAR, IRL, NHRA, CART, Formula One, it is easily seen how the system and method of the present invention is applicable to a wide variety of spectator sports. Auto, aircraft, motorcycle, bicycle, boat racing, horse racing, football, soccer and hockey are just a few examples. Even hunting or fishing tournaments or TV shows would benefit from the system and method hereof. For example, a golf spectator (on the course or at home) might use the portable device while accompanying a particular golfer during a round. Information on the position of the player's golf ball can be supplied from a variety of sources—currently the PGA uses triangulation to acquire the data during play and provides the golf ball position information on its web site. However, the information could easily be gathered by a portable GPS unit accompanying the golfer's caddy or other dedicated data gatherer accompanying the golfer. Once the golf ball position information of each player is gathered, the information is distributed to the spectator based on the spectator's desires. As may be surmised from the NASCAR description above, the golf spectator might determine the angle or view of the graphic rendering, the tilt, pan or zoom of the graphic depiction, the format of the presentation, i.e. graphic of a hole or a tabular summary of all golfers, or one golfer, statistics for a location or hole, etc.

While one limitation to the applicability of the present invention to a spectator sport is the ability to determine the position of a participant, those limitations are becoming less meaningful as technology progresses. For example, with current technology a football player can be fitted with a GPS device and radio that weighs less than ½ pound and is accurate within 5 meters. Foreseeable technology will enable such a device weighing several ounces (mostly battery weight), accurate with WAAS to less than 2 meters and with post-processing to centimeter accuracy. Accuracy to GPS positioning in an outdoor, unobstructed, clutter-free environment will soon be better than one meter. Post-processing at the server can occur in real time (or near real time) to achieve the desired participant accuracy. While the preferred embodiment contemplates obtaining participant location information via GPS, other types of location determination sensors are possible, such as proximity sensors, radar or radio triangulation. See e.g. U.S. Pat. No. 5,564,698 for tracking hockey pucks or other objects or people.

While the portable device of the preferred embodiment is a gaming device with GPS and a radio (e.g., GPRS) other types of gaming, PDA, and cell phones may equally be used. Further, although the preferred embodiment contemplates broadcasting participant location information to spectators, the rendering load of the data might be distributed. I.e. some of the graphics pipeline for the rendering could be accomplished at the server before transmission. However, rendering technology is rapidly advancing and becoming increasingly realistic with advances in game technology and as the processing power of the portable device increases and the rendering technology develops, it is anticipated that most of the graphics rendering can be performed at the portable device.

DESCRIPTION OF PREFERRED EMBODIMENTS

Figure 1:
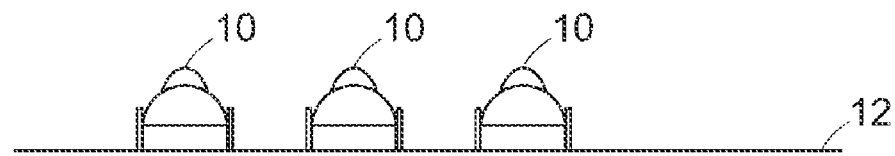
FIG. 1 is a diagram of a screen shot from the portable device showing a head on view of cars on a track.
Figure 2:
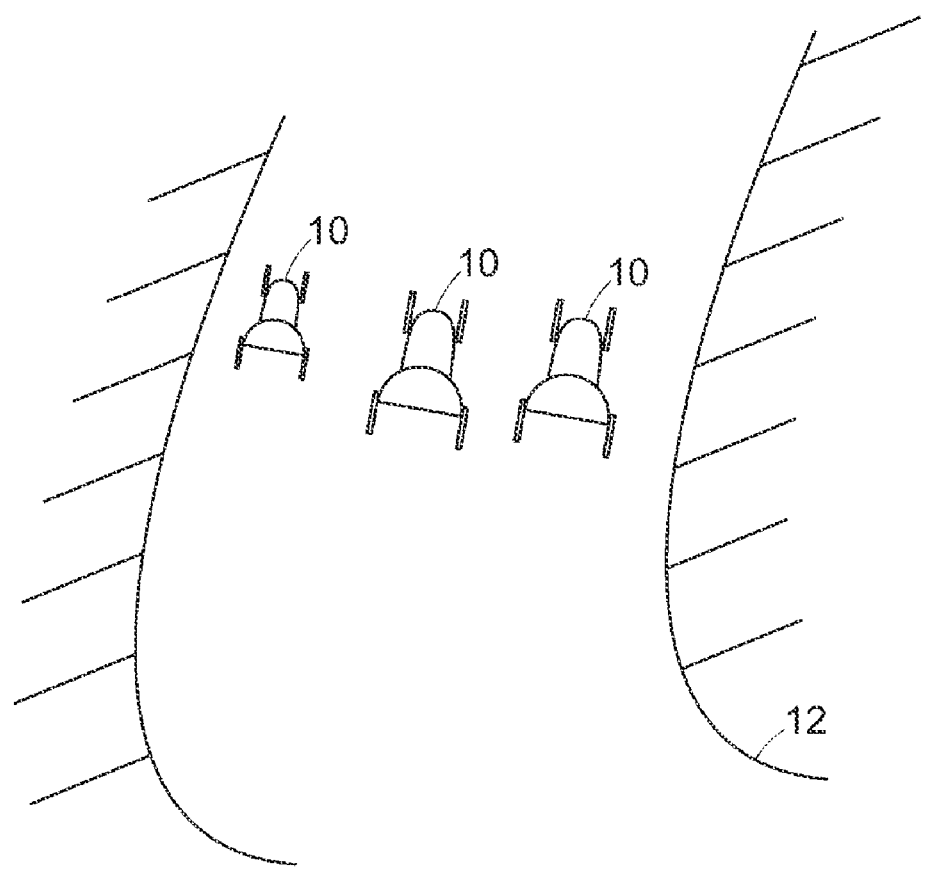
FIG. 2 is a diagram of a screen shot from the portable device showing the cars of FIG. 1 with the rendering tilted up.
Figure 3:
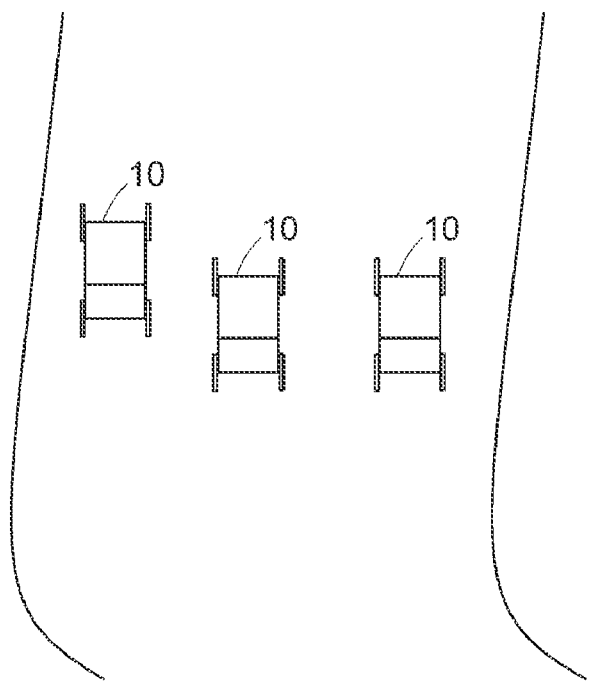
FIG. 3 is a diagram of a screen shot from the portable device showing the cars of FIG. 1 with an overhead view.

Turning to the drawings, cars 10 traverse a track 12. In FIG. 1, the spectator is at the $3^{rd}$ turn of an oval track and FIG. 1 is a rendering similar to the spectator's natural view. In FIG. 2, the spectator has tilted upwardly his view so that the spectator has an oblique angle view of the cars 10 of FIG. 1. FIG. 3 is the same depiction of the cars on the track, but the view is further tilted upward to a direct, overhead view of the track 12.

Figure 4:
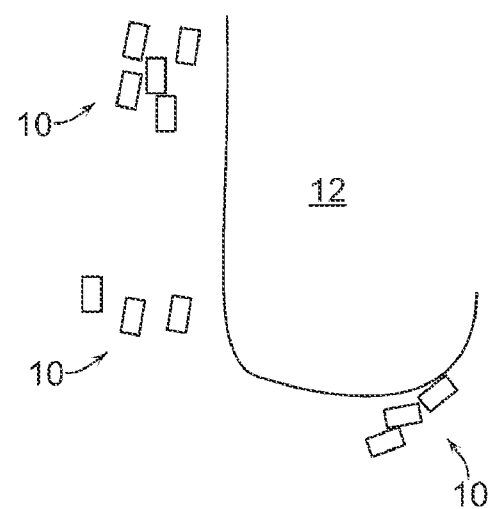
FIG. 4 is a diagram of a screen shot from the portable device showing the cars of FIG. 3 with a zoom out as compared to FIG. 3.
Figure 5:
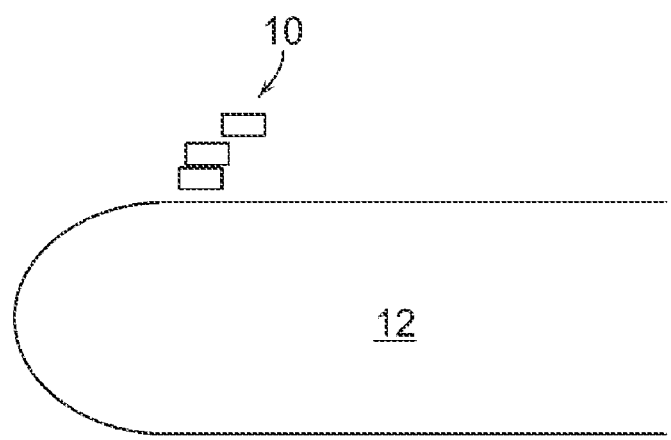
FIG. 5 is a diagram of a screen shot from the portable device showing the cars of FIG. 4 from a different angle or perspective.

FIG. 4 is of a view of the same cars 10 on the track 12 at the same moment in time as FIGS. 1-3, but the view is "zoomed" outwardly changing the scale and allowing the spectator to see more of the cars 10 on the track 12. FIG. 5 is similar in scale to FIG. 4, but the perspective has been changed to the finish line. While the display of the track 12 in FIGS. 1-4 is of an actual race, at time trials the spectator could alternatively obtain from a server a "SimulCam" using technology such as available from Dartfish where each car is superimposed at a certain time into the time trial over the position of other cars.

Figure 6:
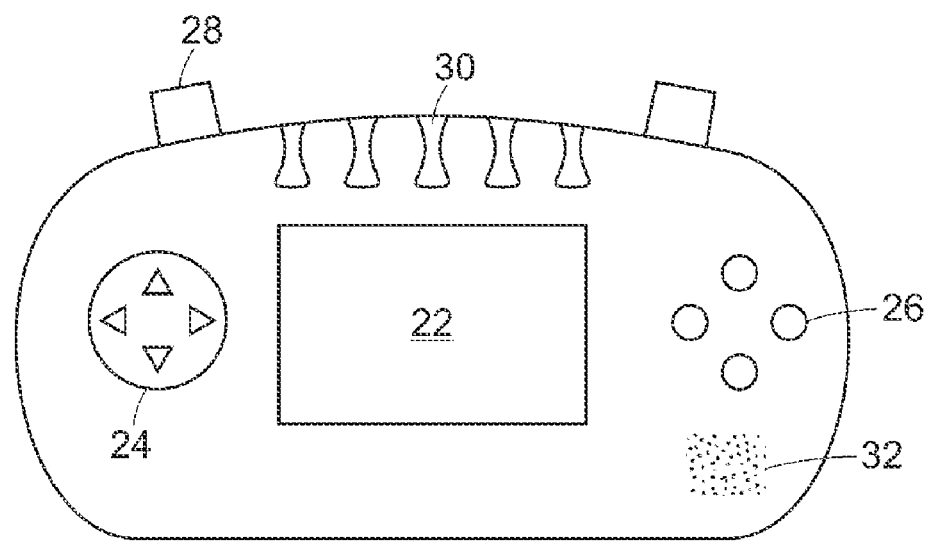
FIG. 6 is a depiction of a portable device.

FIG. 6 is a front elevation of the portable device 20 carried by the spectators. The depiction is of a gaming device manufactured and sold by Gizmondo, Inc., but other such devices having similar functionality can be substituted. The device 20 includes an LCD screen 22, and an 8 way directional pad 24. Face buttons 26 are near the screen, while triggers 28 are on top of the device 20 as shown. Functional buttons 30 and speaker 32 complete the functional items in the view of FIG. 6. Not shown are the SD card slot, USB or power ports, or a camera. The Gizmondo is powered by a 400 MHz ARM9 processor and has a 2.8 inch 320×240 pixels TFT screen 22 and an NVIDIA 128 bit GeForce 3D 4500 GPU featuring a programmable pixel shader, hardware transform engine, and 1280 KB of embedded memory.

While the device 20 of FIG. 6 uses an ARM 9 processor and Sirf GPS chipset, substitutions can be readily made (e.g. uBlox GPS chipset) as well as substitutions to display 22 and memory capacity. The preferred primary communications radio is GPS tri-band for GPRS but other communication links are easily used. GPRS is a connectivity solution based on Internet Protocols that supports a wide range of enterprise and consumer applications. With throughput rates of up to 40 kbit/s, users have a similar access speed to a dial-up modem, but with the convenience of being able to connect from anywhere. A WiFi communications link can alternatively be used, and encrypted if desired, e.g. using Wired Equivalent Privacy or WEP. Sony, Nintendo, and Playstation all make or intend to make premium game consoles with embedded WiFi. Of course, WiFi outdoors has range issues (although this can be several kilometers with improved antennas and line of sight, particularly at the older 900 MHz bandwidths) and power issues which might make WiFi unsuitable for some applications.

Figure 8:
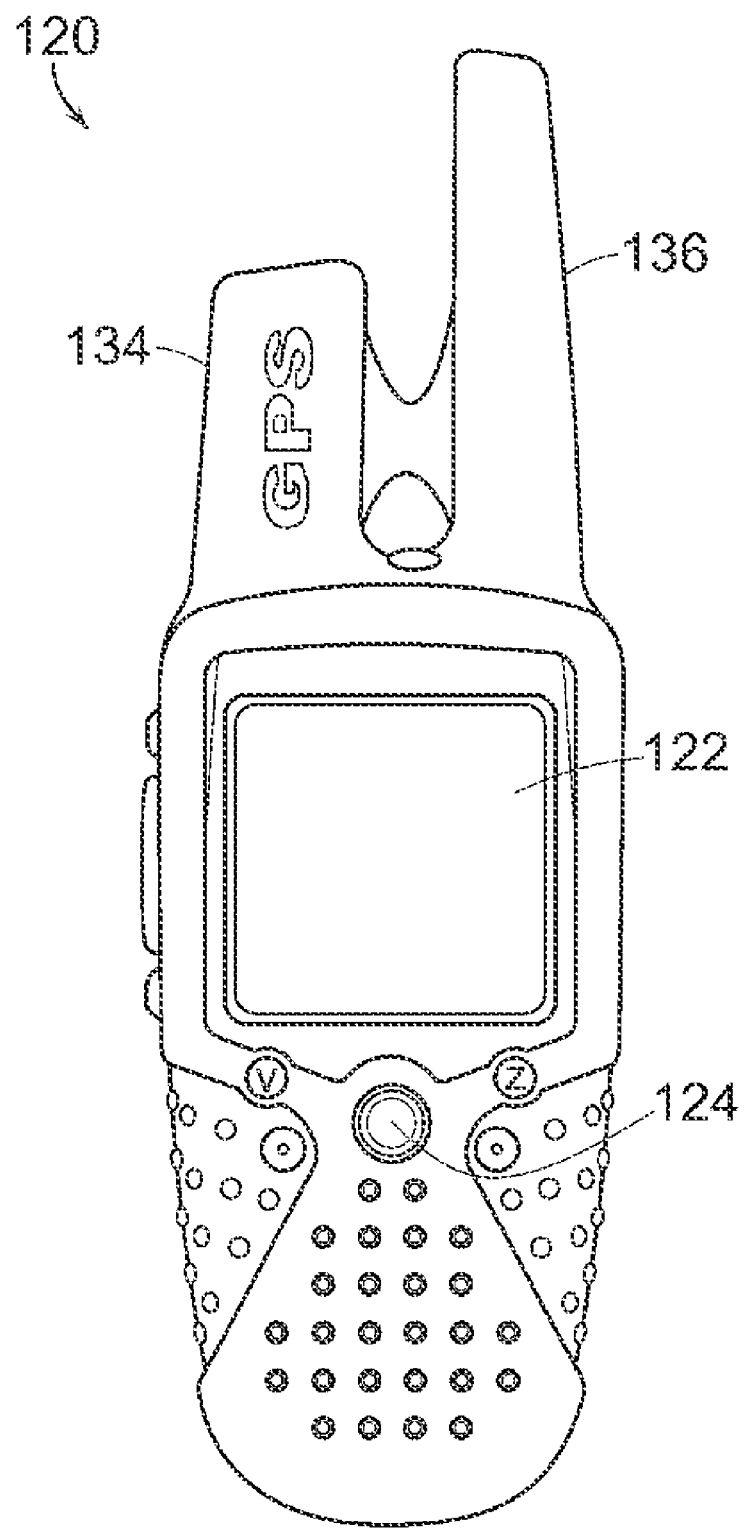
FIG. 8 is a perspective of an alternative embodiment of a portable device, resembling a PDA or a cell phone.
Figure 9:
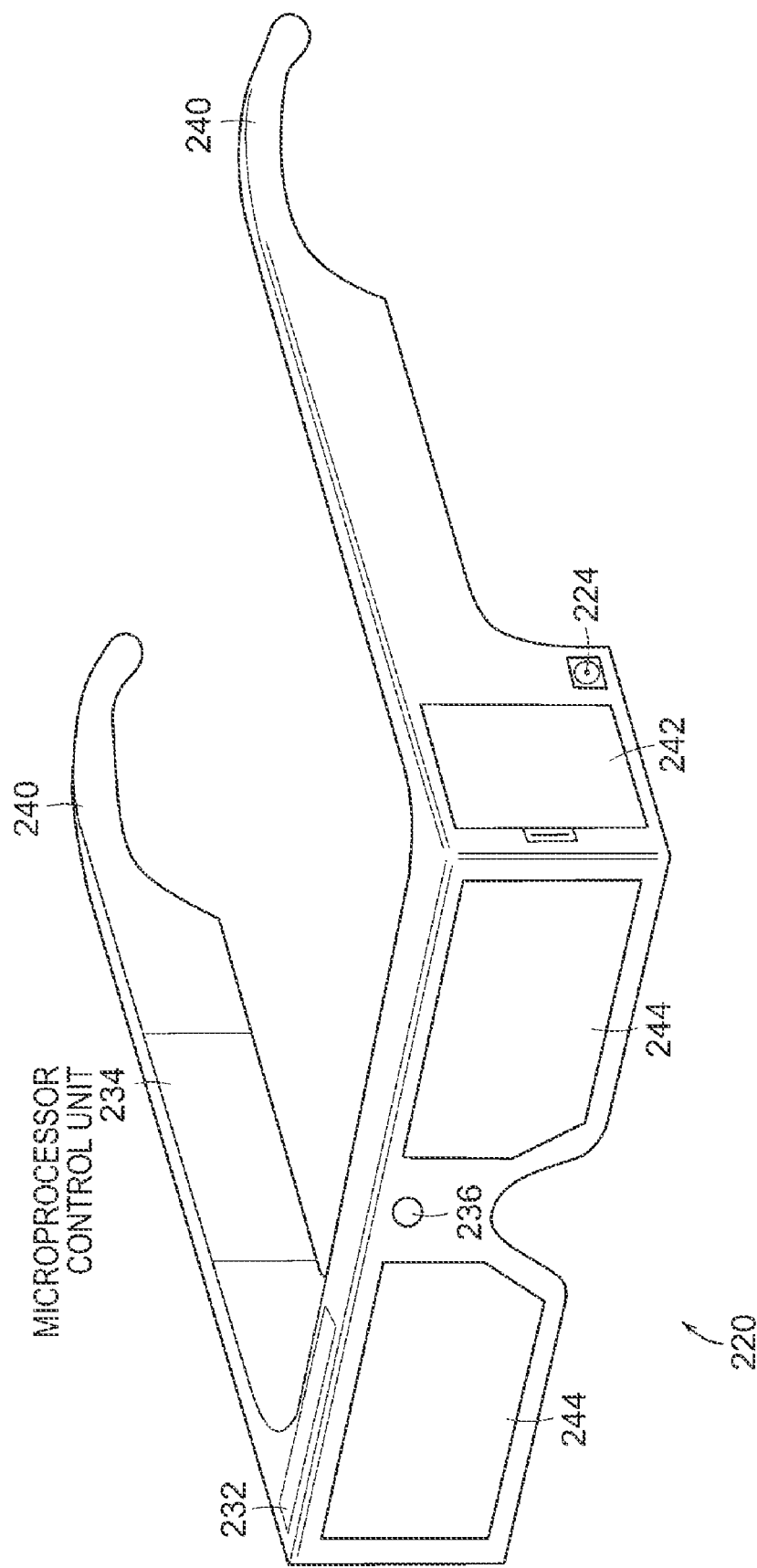
FIG. 9 is a perspective of a portable device where the functionality is built into glasses or goggles worn by the spectator.

FIGS. 8 and 9 each depict an alternative portable device carried by the spectators. For example, the portable device 120 of FIG. 8 includes a GPS/antenna 134, communications antenna and radio 136, a display 122, and a directional pad 124. In addition to the Gizmondo type device of FIG. 6, in the near term gaming consoles with GPS and a radio are the best alternatives, such as made by Sony PSP or N Gage OD. However, PDA and cell phone form factors will be viable long term as portable devices, such as Mio A701, HP iPaQ, and Siemens.

Similarly, the portable device 220 of FIG. 9 is in the configuration of glasses or goggles and includes a GPS and patch antenna 232, microprocessor 234, radio 236. Controls, such as the directional pad 224, are on the side frames (opposite side not shown, but analogous to FIG. 6). Batteries are stored in compartment 242. The displays are transparent LCD's as at 244. Examples of such a device are the MyVue headset made by MicroOptical Corp. of Westwood, Mass. (see, U.S. Pat. No. 6,879,443). A particular benefit of the use of wearable glasses such as the embodiment of FIG. 9 is the ability to incorporate augmented reality, e.g. point of interest overlays. The yellow first down marker in football television broadcasts is an example. In this embodiment, a finish line or other point of interest overlays or markers can be highlighted, or a particular participant, or statistics on a particular participant can be viewed. In the NASCAR example, a spectator wearing the FIG. 9 glasses could see the cars, "augmented" track data (finish line) and selectively highlight a particular car and statistics for that car (e.g. fuel remaining, lap time, time back or ahead, mile per hour, miles remaining, etc.) See, e.g. U.S. Pat. Nos. 7,002,551; 6,919,867; 7,046,214; 6,945,869; 6,903,752; 6,317,127 (herein incorporated by reference.)

As used herein, GPS is meant to include all of the current and future positioning systems that include satellites, such as the U.S. Navistar, GLONASS, Galileo, EGNOS, WAAS, MSAS, QZSS, etc. The accuracy of the positions, particularly of the participants, can be improved using known techniques, often called differential techniques, such as WAAS (wide area), LAAS (local area), Carrier-Phase Enhancement (CPGPS), Wide Area GPS Enhancement (WAGE), or Relative Kinematic Positioning (RKP). Even without differential correction, numerous improvements are increasing GPS accuracy, such as the increase in the satellite constellation, multiple frequencies ($L_1$, $L_2$, $L_5$), modeling and AGPS improvements, software receivers, and ground station improvements. Of course, the positional degree of accuracy is driven by the requirements of the application. In the NASCAR embodiment of the preferred embodiment, two meter accuracy provided by WAAS would normally be acceptable.

Figure 7:
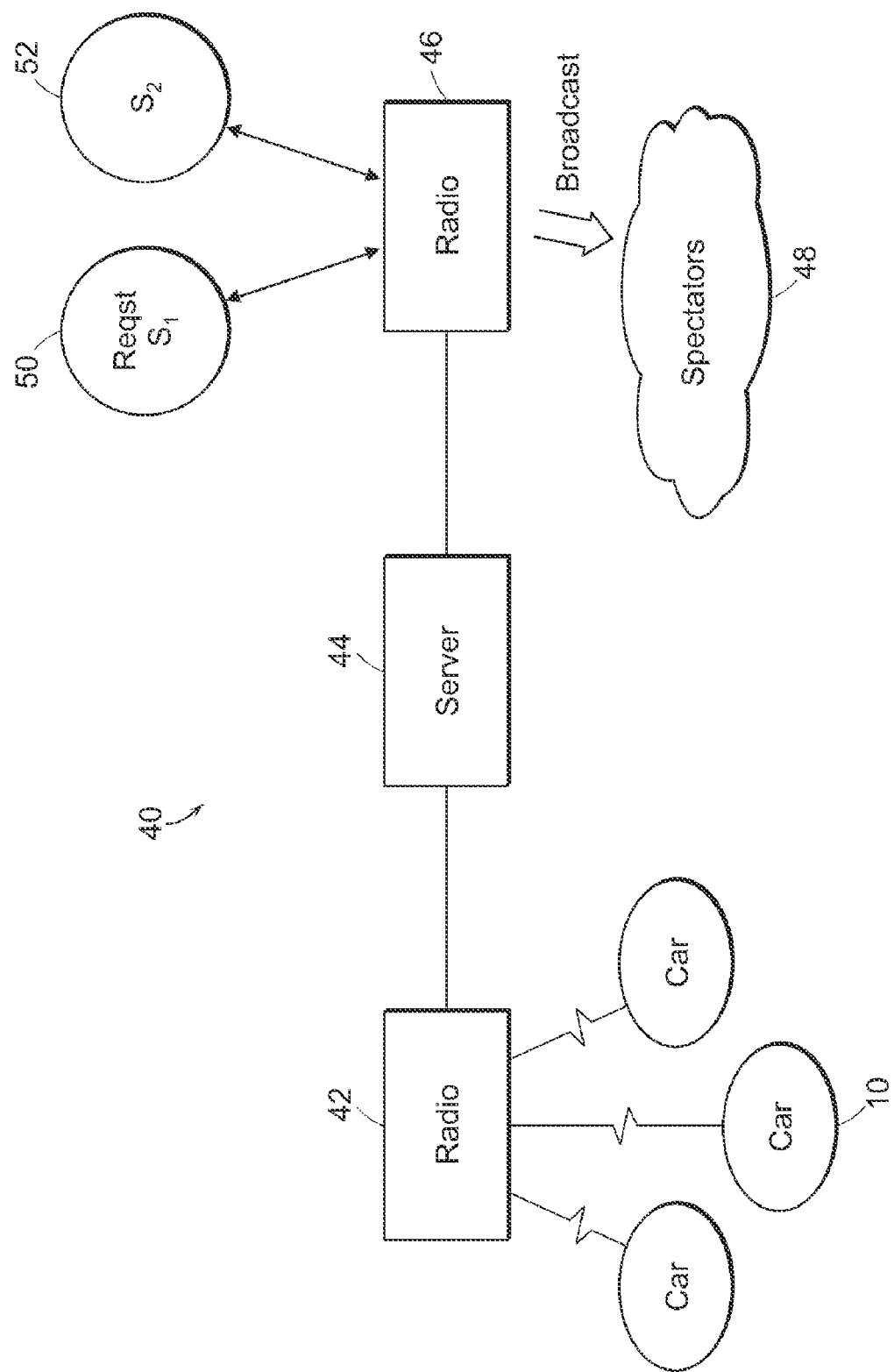
FIG. 7 is a block diagram depicting the network at a racetrack.

In FIG. 7, a depiction of the network 40 is shown. The cars 10 communicate with a radio base station 42 preferably using spread spectrum radio (encrypted or secured if desired). A spread spectrum radio such as made by Freewave Technologies of Boulder, Colo. is a preferred choice (e.g. a 900 MHz board level module). The server 44 stores the position data of each car 10 communicated to the base station 42, and other pertinent data such as car sensor data, etc. Ideally, the server 44 can also digitally store the voice communications of interest (e.g. pit to driver) and video clips of various scenes of possible interest. Of course, the server 44 can store advertising messages as well for delivery to spectators. The server 44 can also be used for authentication of portable devices 20 and enable selectable purchases from spectators (i.e. refreshments or memorabilia for delivery). The server 44 can also process the incoming position data to increase the accuracy if desired. For example, the server 44 can include its own base station GPS and apply a correction to a participant's position if desired. In some sports, the participants might broadcast location information directly to spectators, i.e. without an intervening server. The radio 46 is used to communicate on a broadcast basis to all spectators 48—here using a GSM triband, the GPS position information of the cars 10 (encrypted or secured if desired). The devices 20 in the hands of the spectators 48 processes the position information to render the views illustrated for example in FIGS. 1-5.

While the preferred embodiment contemplates most processing occurring at device 20, different amounts of preprocessing of the position data can be processed at the server 44. For example, the participant information can be differentially corrected at the server (using e.g. either WAAS or a local area differential correction) or even information post-processed with carrier phase differential to achieve centimeter accuracy. Further, it is anticipated that most of the graphics rendering can be accomplished at the portable device 20, but an engineering choice would be to preprocesses some of the location and rendering information at the server 44 prior to broadcast.

Graphics

The graphics generated on the screen 22 can be 2D graphics, such as geometric models (also called vector graphics) or digital images (also called raster graphics). In 2D graphics, these components can be modified and manipulated by two-dimensional geometric transformations such as translation, rotation, scaling. In object oriented graphics, the image is described indirectly by an object endowed with a self-rendering method—a procedure which assigns colors to the image pixels by an arbitrary algorithm. Complex models can be built by combining simpler objects, in the paradigms of object-oriented programming. Modern computer graphics card displays almost overwhelmingly use raster techniques, dividing the screen into a rectangular grid of pixels, due to the relatively low cost of raster-based video hardware as compared with vector graphic hardware. Most graphic hardware has internal support for blitting operations and sprite drawing.

Preferably, however, the graphics generated on screen 22 are 3D. OpenGL and Direct3D are two popular APIs for the generation of real-time imagery in 3D. (Real-time means that image generation occurs in 'real time', or 'on the fly') Many modern graphics cards provide some degree of hardware acceleration based on these APIs, frequently enabling the display of complex 3D graphics in real-time. However, it's not necessary to employ any one of these to actually create 3D imagery. The graphics pipeline technology is advancing dramatically, mainly driven by gaming applications enabling more realistic 3D synthetic renderings of FIGS. 1-5.

3D graphics have become so popular, particularly in computer games, that specialized APIs (application programmer interfaces) have been created to ease the processes in all stages of computer graphics generation. These APIs have also proved vital to computer graphics hardware manufacturers, as they provide a way for programmers to access the hardware in an abstract way, while still taking advantage of the special hardware of this-or-that graphics card. These APIs for 3D computer graphics are particularly popular:

OpenGL and the OpenGL Shading Language
OpenGL ES 3D API for embedded devices
Direct3D (a subset of DirectX)
RenderMan
RenderWare
Glide API TruDimension LC Glasses and 3D monitor API There are also higher-level 3D scene-graph APIs which provide additional functionality on top of the lower-level rendering API. Such libraries under active development include:
QSDK
Quesa
Java 3D
JSR 184 (M3G)
NVidia Scene Graph
OpenSceneGraph
OpenSG
OGRE
Irrlicht
Hoops3D Photo-realistic image quality is often the desired outcome, and to this end several different, and often specialized, rendering methods have been developed. These range from the distinctly non-realistic wireframe rendering through polygon-based rendering, to more advanced techniques such as: scanline rendering, ray tracing, or radiosity. The rendering process is computationally expensive, given the complex variety of physical processes being simulated. Computer processing power has increased rapidly over the years, allowing for a progressively higher degree of realistic rendering. Film studios that produce computer-generated animations typically make use of a render farm to generate images in a timely manner. However, falling hardware costs mean that it is entirely possible to create small amounts of 3D animation on a small processor, such as in the device 20. Driven by the game studios, hardware manufacturers such as ATI, Nvidia, Creative Labs, and Ageia have developed graphics accelerators which greatly increase the 3D rendering capability. It can be anticipated that in the future, one or more graphics rendering chips, such as the Ageia Physx chip, will be added to the device 20.

While full 3D rendering is not possible with the device 20 described herein, advances in processing and rendering capability will enable greater use of 3D graphics in the future. In a particular application, such as NASCAR, a car object and a track object (e.g., Taladega) can be rendered in advance and stored, making realistic 3D graphics possible. In 3D computer graphics, the terms graphics pipeline or rendering pipeline most commonly refer to the current state of the art method of rasterization-based rendering as supported by commodity graphics hardware. The graphics pipeline typically accepts some representation of a 3D scene as an input and results in a 2D raster image as output.

Requests

Special requests from spectators 48 can be made to the server 44, such as for streaming video of a particular scene or audio of a particular car 10, refreshment orders, memorabilia purchases, etc. This function is shown as at 50, 52 in FIG. 7.

While the preferred embodiment has been described in the context of a spectator in physical attendance at a sporting event, the use of the portable devices 20 at remote locations is equally feasible. For example, the portable device 20 can be used at home while watching a sporting event on TV, with the participant location and other information streaming over the internet. WiFi in the home is a preferred mode of broadcasting the information between the portable device and the network.

What is claimed:
1. A system for observing a sporting event comprising:
  wherein said sporting event includes a plurality of moving sport participants, and having a positioning mechanism for determining a participant position;
  a base station for receiving said participant positions and having a radio for transmitting said participant positions; and
  a plurality of portable devices accompanying respective spectators, each portable device including a radio for receiving participant positions and a graphics display selectable by the spectator to display perspective views of the sporting event from different viewing locations, a GPS receiver for determining the spectator's location, wherein at least one view includes a rendered graphical representation of a participant, and the sport venue based on participants determined positions, so that at least one of said spectator views selectable on the display is a view form the spectator's location based on spectator's determined position.

2. The system of claim 1, wherein said number of portable devices includes a processor for receiving said participant positions and for comparing said participant positions with said spectator's location, and is coupled to said graphics display to generate said spectator view from the spectator's location of one or more participant positions.

3. The system of claim 2, wherein said spectator view from the spectator's location is adjustable by the user to zoom in or out.

4. The system of claim 1, wherein one of said spectator's different views is an overhead view of the sporting venue.

5. The system of claim 1, wherein one of said spectator's different views is an enlarged zoom view.

6. The system of claim 1, wherein one of said spectator's different views is a horizontally shifted pan view.

7. The system of claim 1, wherein one of said spectator's different views is a view from a participant's position.

8. The system of claim 1, wherein said positioning mechanism includes a triangulation positioning system.

9. The system of claim 1, wherein said positioning mechanism includes a GPS receiver for determining a GPS position, and a radio for transmitting said GPS position to said base station.

10. The system of claim 1, wherein the view from the spectator position comprises a perspective view and an augmented reality overlay.

11. The system of claim 10, wherein the augmented reality overlay includes a highlight of at least one of the participants.

12. The system of claim 10, wherein the augmented reality overlay includes information concerning at least one of the participants.

13. The system of claim 10, wherein the augmented reality overlay includes information concerning the sporting event venue.

14. The system of claim 1, wherein the portable device comprises glasses.

15. The system of claim 1, wherein the portable device comprises a handheld device.

16. A method for observing a sporting event comprising:
  determining a position of one or more participants at the venue of the sporting event;
  transmitting the determined position of each participant;
  equipping one or more spectators with a device having a graphics display, a GPS receiver for determining a spectator's location;
  communicating the one or more participant positions to the spectator's device; and
  viewing on the graphics display of the device a perspective depiction of the one or more participant positions at said venue, whereby the spectator can selectively change the location of the points of view, and said perspective depiction includes a rendered graphical representation of a participant, wherein one of the selectable points of view being not from the spectator's location.

17. The method of claim 16, wherein one of said points of view being from a participant's position.

18. The method of claim 16, wherein said participant position determining step comprises equipping a plurality of participants with a GPS receiver to determine participant position.

19. The method of claim 16, wherein said participant positions are transmitted to a server, wherein said spectator's device authenticates with said server, and wherein said server communicates said participant positions to authenticated devices.

20. The method of claim 16, wherein said devices are remote from said venue, and said participant positions are communicated to said devices over a wide area network.

21. The method of claim 16, including communicating advertising messages to the spectator.

22. The method of claim 16, wherein said rendered graphical representation comprises an augmented reality overlay of at least one of the participants.

23. A method of viewing a live event in real time by a spectator comprising:
 determining the position of the spectator using a GPS receiver;
 wirelessly receiving the positions of a number of participants at said live event;
 rendering in real time a graphical representation concerning said participant positions at said live event;
 viewing in real time the graphical representation from said spectator position, wherein said viewing does not include live video, and wherein said spectator's position is not an overhead view of said live event; and
 selectively changing the view point of said graphical representation from said spectator position to another position, wherein said spectator position is not a fixed camera location.

24. The method of claim 23, wherein changing the view point of said graphical representation comprises enlarging the graphical information to a zoom view.

25. The method of claim 23, wherein changing the view point of said graphical representation comprises rotating the graphical information in a vertical axis to a tilt view.

26. The method of claim 23, including transmitting service requests from the spectator.

27. The method of claim 23, wherein changing the view point of said graphical representation comprises changing the view point to the location of a participant.

28. The method of claim 23, including communicating information concerning at least one of the participants to the spectator.

29. The method of claim 28, wherein said rendered graphical representation includes advertising messages.

30. The method of claim 23, including communicating advertising messages to the spectator.

31. The method of claim 23, wherein the graphical information is a 3D graphics rendering of said live event.

32. The method of claim 23, wherein the graphical representation comprises an augmented reality overlay.

33. A portable device for observing a live event at a venue comprising:
 a radio for receiving positions of moving participants at said live event venue;
 a graphics display for displaying perspective views of the live event, wherein the display is selectable to depict perspective views of the live event from different viewing locations at the venue; and
 a graphics rendering processor for receiving said participant positions from said radio and rendering a graphical representation on said display of said participants in the received positions at said live event venue, and for rendering the graphical representation of new participant positions as said participants move about the venue.

34. The device of claim 33, wherein the graphical representation is an augmented reality overlay that includes a highlight of at least one of the participants.

35. The device of claim 33, wherein the graphical representation includes appended information concerning at least one of the participants.

36. The device of claim 33, wherein the graphics processor presents information concerning the event venue on the graphics display.

37. The device of claim 33, wherein the graphics processor presents advertising messages on the graphics display.

* * * * *

UNITED STATES PATENT AND TRADEMARK OFFICE
CERTIFICATE OF CORRECTION

| | | |
|---|---|---|
| PATENT NO. | : 7,855,638 B2 | Page 1 of 1 |
| APPLICATION NO. | : 11/456715 | |
| DATED | : December 21, 2010 | |
| INVENTOR(S) | : Huston | |

It is certified that error appears in the above-identified patent and that said Letters Patent is hereby corrected as shown below:

Claim 1 at col. 8, line 14: Please delete "form" and replace with --from--.

Signed and Sealed this
Twelfth Day of April, 2011

David J. Kappos
*Director of the United States Patent and Trademark Office*